United States Patent [19]
Rynberk

[11] Patent Number: 5,640,801
[45] Date of Patent: Jun. 24, 1997

[54] LANDSCAPE BORDER DIVIDER

[75] Inventor: Robert W. Rynberk, Orland Park, Ill.

[73] Assignee: Valley View Specialties Co., Crestwood, Ill.

[21] Appl. No.: 533,246

[22] Filed: Sep. 25, 1995

[51] Int. Cl.$^6$ ..................................... A01G 1/08
[52] U.S. Cl. ..................... 47/33; 52/102; 404/7
[58] Field of Search ................ 404/7, 8; 47/33; 52/102

[56] References Cited

U.S. PATENT DOCUMENTS

| | | |
|---|---|---|
| 3,387,786 | 6/1968 | Rynberk . |
| 3,841,022 | 10/1974 | Thodos .......................................... 47/33 |
| 4,644,685 | 2/1987 | Tisbo et al. ................................... 47/33 |
| 5,201,154 | 4/1993 | Thomas ...................................... 47/33 X |
| 5,212,917 | 5/1993 | Kurtz et al. ................................. 404/7 X |
| 5,315,780 | 5/1994 | Thomas ......................................... 47/33 |
| 5,377,447 | 1/1995 | Fritch ....................................... 404/7 X |
| 5,379,546 | 1/1995 | Popp .............................................. 47/33 |
| 5,501,036 | 3/1996 | Torp, Jr. et al. ........................ 52/102 X |

OTHER PUBLICATIONS

Drainage Industry divider described on p. 3 of the specification.

*Primary Examiner*—James Lisehora
*Attorney, Agent, or Firm*—Rudnick & Wolfe

[57] ABSTRACT

An assembly of a divider and stakes installed to define the limits of a flower bed or the like relative to adjoining ground wherein the height of the flower bed surface is greater than that of the adjoining ground. The divider comprises an extruded length of plastic including an enlarged upper section and a flange formed integrally with the upper section and extending along the length of said upper section and downwardly from said upper section to a bottom edge. A plurality of flaps are formed integrally with the bottom edge and extend laterally outwardly from the bottom edge. At least one slot is formed in at least some of said flaps, the slots being adapted for receipt of stakes whereby the enlarged upper section is positioned at the height of said bed, with the stakes penetrating the adjoining ground and securing the flaps in overlying relationship with the adjoining ground.

7 Claims, 3 Drawing Sheets

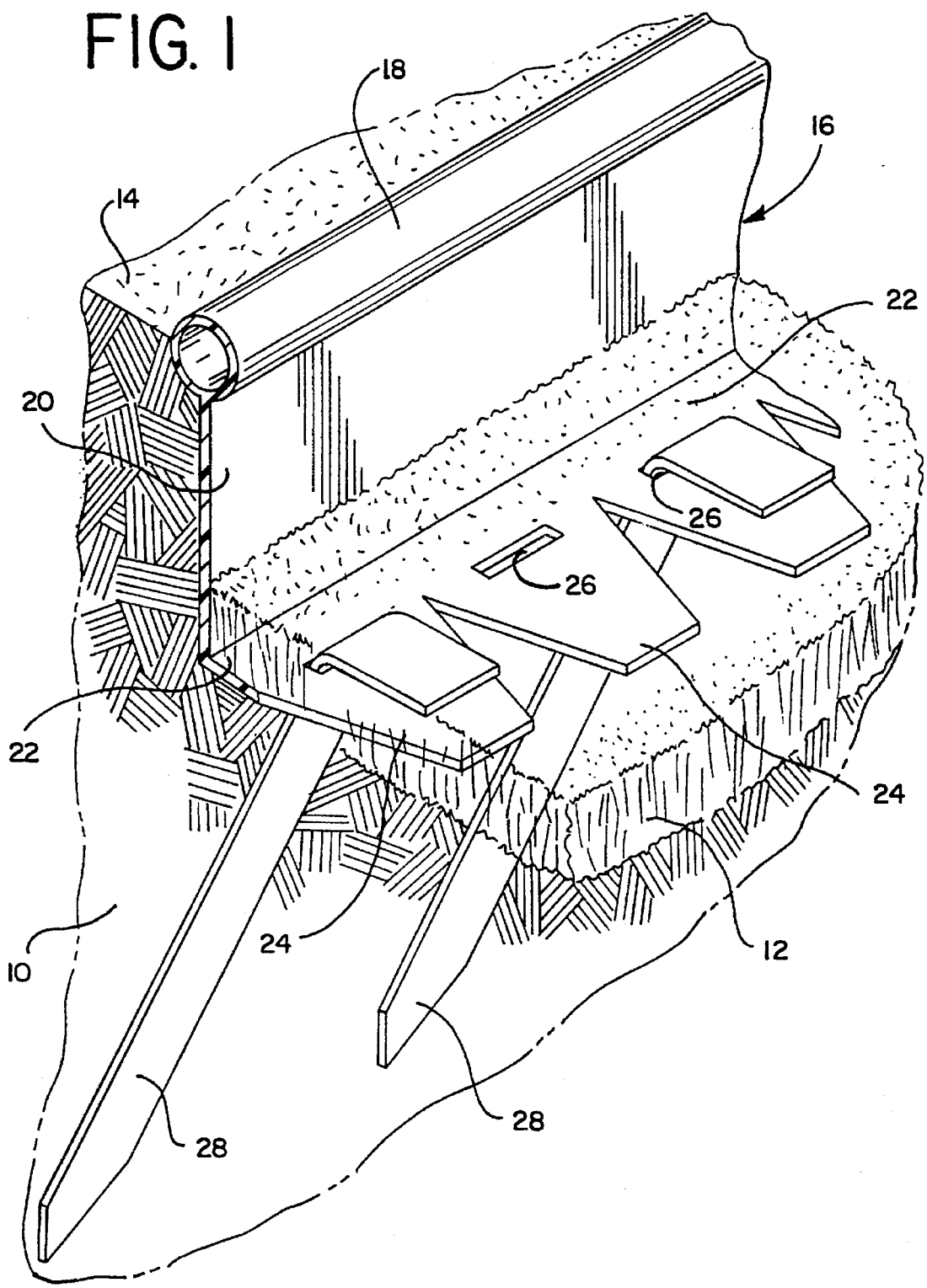
FIG. I

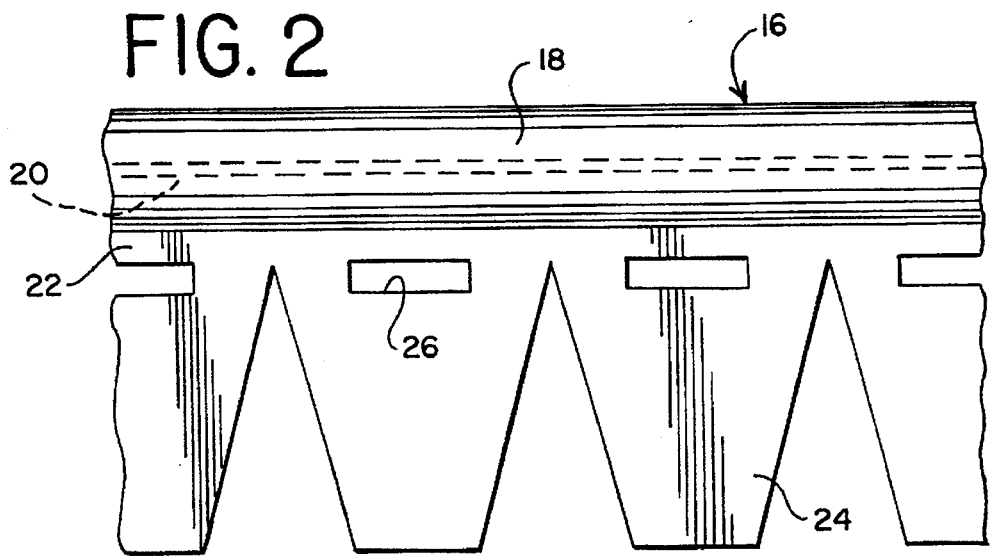
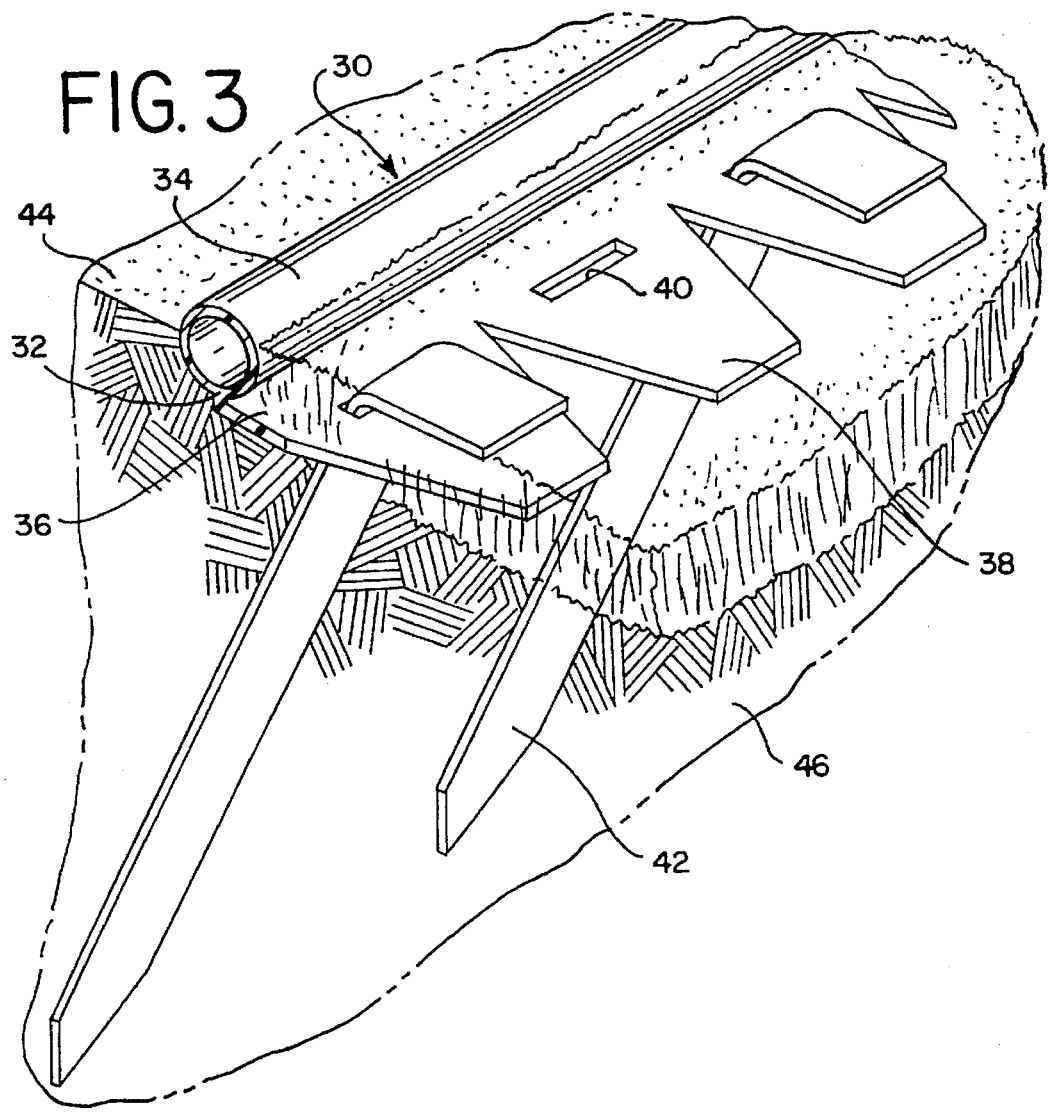

LANDSCAPE BORDER DIVIDER

BACKGROUND OF THE INVENTION

This invention relates to an assembly of parts adapted to be employed in landscaping. In particular, the invention is concerned with a divider construction adapted to be employed for dividing a lawn or other area from another area such as a flower bed.

The use of dividers for landscaping purposes is well known. In the past, dividers were formed of wood, concrete or metal. Wood dividers were considered unsightly and bulky and they required relatively frequent painting. In addition, they had to be replaced periodically due to the fact that they would readily rot under most conditions.

Metal dividers were subject to corrosion, and/or they could also be readily bent or otherwise damaged, particularly when stuck by mowers, edgers, spreaders, wheelbarrows or other lawn care equipment. Thin sheet metal dividers were also a hazard because they presented relatively sharp cutting edges. Concrete dividers were and are still satisfactory from a performance standpoint; however, the installation of such dividers remains prohibitively expensive in most cases.

Rynberk U.S. Pat. No. 3,387,786 describes a divider which constituted a significant breakthrough in the art. This invention was directed to elimination of various problems encountered when employing dividers, for example in situations which involve the use of beds formed outside the walls of a building to catch water dripping from the eaves. Such beds eliminate damage to the sod and they avoid the splashing of mud on the sides of the building. Shrubbery is often planted within the beds to suit landscaping plans.

Dividers were preferably employed in such arrangements since they reduce the amount of displacement of dirt or gravel onto grass areas and they prevent the growth of grass into the bed.

The Rynberk patent, in particular, disclosed a divider defining the limits of a landscaped plot comprising an extruded length of plastic including an enlarged upper section. An integrally formed flange extended downwardly from the upper section and was adapted to be substantially completely inserted in the ground whereby the upper section was located immediately above the top surface of the ground while the flange acted as a barrier to the growth of grass, roots and the like into the plot. The flange means comprised a relatively narrow portion extending substantially completely along the length of said upper section, and a projecting portion attached to the flange adjacent the bottom edge thereof assisted in securing the flange in place. Stakes could be driven through the projecting portion to hold the divider firmly in place, and gravel or soil would be used to bury the flange and stakes.

The Rynberk patent also described means allowing the separate lengths of dividers to be assembled. For example, one end of the upper section could be provided with a larger diameter extension for interfitting in telescoping relationship with an adjacent divider whereby separate lengths of dividers were interconnected. Later innovations involved the use of plugs interfitting with and interconnecting adjacent divider sections.

Various attempts have been made to improve upon the Rynberk divider but these have been largely unsuccessful. For example, a divider was designed by Drainage Industries of Appleton, Wis. which consisted of an enlarged upper section and integrally-formed flaps. These flaps could be placed in an overlying position on the ground and stakes driven through the flaps and into the ground. This arrangement is, however, quite insecure when compared with the buried flange and stakes used by Rynberk.

SUMMARY OF THE INVENTION

In accordance with this invention, a divider is provided for defining the limits of a flower bed or the like relative to adjoining ground. The divider comprises an extruded length of plastic including an enlarged upper section and a flange formed integrally with the upper section. The flange extends along the length of the upper section and downwardly from the upper section to a bottom edge. A plurality of flaps are formed integrally with the bottom edge and extend laterally outwardly from the bottom edge. Slots are formed in at least some of the flaps and the slots are adapted for receipt of a stake for securing the flaps in overlying relationship with the ground.

The invention is particularly suited for applications wherein an assembly of a divider and stakes is installed in an area where the height of the flower bed surface is greater than that of the adjoining ground. The divider is located whereby the enlarged upper section is positioned at the height of the bed and with the stakes penetrating the adjoining ground and securing the flaps in overlying relationship with the adjoining ground. It has been found that this arrangement creates a surprisingly more secure assembly when compared, for example, with the aforementioned Drainage Industries arrangement.

BRIEF DESCRIPTION OF THE DRAWINGS

FIG. 1 is a fragmentary perspective view of a divider assembly characterized by the feature of this invention;

FIG. 2 is a fragmentary elevational view of the divider portion of the assembly;

FIG. 3 is a fragmentary perspective view of a divider assembly constituting an alternative form of the invention; and, FIG. 4 is a fragmentary side elevational view of the form of the invention shown in FIG. 3 as it appears when secured in place.

DESCRIPTION OF THE PREFERRED EMBODIMENTS

Figure 4:
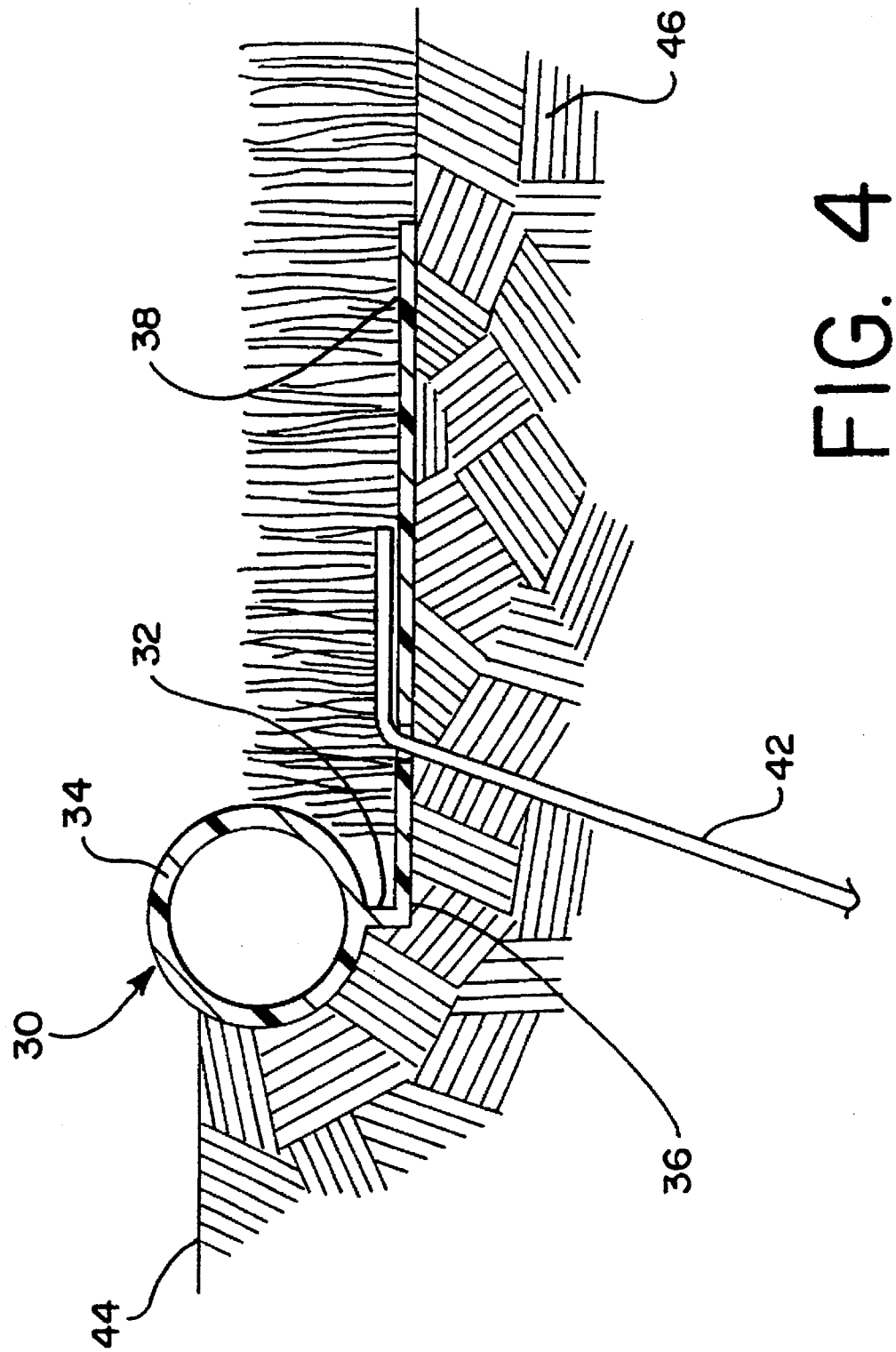

FIG. 1 illustrates a ground formation 10 which includes a grassy area 12 at one vertical level. The area 14, intended for use as a flower bed, location for shrubbery, or the like, is illustrated at a higher level which is often the case with current landscaping practices.

Divider 16 shown in FIGS. 1 and 2 is especially suited for use in connection with landscaping of this nature. This divider comprises a one-piece length preferably formed of extruded polyethylene or equivalent plastic, and consisting of an enlarged upper section 18 and a depending flange 20. The upper section is hollow to save material cost and weight. As described in the Rynberk patent, this upper section could also be used as a water passage with holes formed in the section wall permitting irrigation of the area 14.

The flange 20 defines a bottom edge and a continuous rim 22 extends outwardly from the bottom edge. A plurality of flaps 24, each shaped in the form of a truncated triangle, extend further outwardly from the rim.

The flaps 24 define openings 26, and stakes 28 are adapted to be driven through these openings into the ground for securing the divider in place. It will be noted that the openings have a shape approximately corresponding to the cross-section of the stakes 28 to facilitate insertion of the stakes. The flaps 24 and openings 26 can be readily formed in a stamping operation conducted after the extrusion operation.

The design of the divider 16 permits bending to a reasonable degree to allow for use with respect to contoured landscaped areas. In addition, connectors are available from the assignee of the Rynberk patent, Valley View Specialties Co., whereby a plurality of extruded lengths may be interconnected to accommodate landscaped areas of various sizes and shapes. Typically, such connectors include reduced diameter elements receivable within the hollow interiors of the upper sections of adjacent divider lengths.

The divider 16 preferably defines a flange height from the bottom edge to the top thereof (not including the upper section) of from 2-½ to 5 inches. FIGS. 3 and 4 illustrate an alternative form wherein divider 30 is provided with a considerably shorter flange 32. This divider also includes an upper section 34 and a continuous rim portion 36 with integrally formed flaps 38. Openings 40 in the flaps receive stakes 42 for securing the divider in the ground.

The divider 30 is especially useful for landscaping wherein the height of bed area 44 is not greatly in excess of the ground 46 where grass is growing. Preferably, the divider flange has a height of from ⅛ to ¼ inch in this embodiment.

FIG. 4 illustrates the flaps 38 of divider 30 after stakes 42 have been driven completely into the ground. Although grass cannot grow through the flaps, they will be obscured by the surrounding growth so that the final arrangement will be aesthetically pleasing.

It will be understood that various changes and modifications may be made in the above-described invention without departing from the spirit thereof particularly as recited in the following claims.

I claim:

1. An assembly of a divider and stakes installed to form a border between adjacent areas of a lawn and garden to define the limits of the garden bed relative to adjoining ground comprising said lawn, said garden bed being located at a first elevation and said ground being located at a second elevation beneath said first elevation, and wherein a vertical face of said bed extends downwardly around the perimeter of the bed between said first and second elevations, said divider comprising a one-piece extruded length of plastic including an enlarged upper section, a flange formed integrally with said upper section and extending along the length of said upper section and downwardly from said upper section to a bottom edge, a plurality of flaps formed integrally with said bottom edge, a slot formed in one of said flaps, said slot being adapted for receipt of one of said stakes, a slot formed in at least one additional one of said flaps for receipt of an additional stake, said divider being located whereby said enlarged upper section is positioned at said first elevation, said flange being positioned against said vertical face to support said vertical face, and said stakes penetrating said adjoining ground at said second elevation to secure the flaps in overlying relationship with the adjoining ground.

2. An assembly according to claim 1 wherein said divider includes a continuous rim extending perpendicularly outwardly from said bottom edge, said flaps extending outwardly from said rim.

3. An assembly according to claim 2 with said flaps being in the shape of truncated triangles.

4. An assembly according to claim 3 wherein said slots define rectangles, and wherein the dimensions of the rectangles substantially correspond with the cross-sectional dimensions of said stakes to facilitate insertion of the stakes in the slots.

5. An assembly according to claim 1 wherein the bottom edge of said flange is spaced from 2-½ to 5½ inches from the top of the flange.

6. An assembly according to claim 1 wherein the bottom edge of said flange is spaced from ⅛ to ¼ inches from the top of the flange.

7. A method for forming a border between adjacent areas of a lawn and garden to define the limits of the garden bed relative to the adjoining ground comprising said lawn, said garden bed being located at a first elevation and said ground being located at a second elevation beneath said first elevation, and wherein a vertical face of said bed extends downwardly around the perimeter of said bed, the steps comprising providing a divider comprising a one-piece extruded length of plastic including an enlarged upper section, a flange formed integrally with said upper section and extending along the length of said upper section and downwardly from said upper section to a bottom edge, a plurality of flaps formed integrally with said bottom edge and extending laterally outwardly from the bottom edge, a slot formed in one of said flaps and at least one additional flap also having a slot formed therein, providing a plurality of stakes, each said slot being adapted for receipt of one of said stakes, locating said divider by positioning said enlarged upper section at said first elevation, positioning said flange against said vertical face to support the vertical face, locating the flaps at said second elevation in overlying relationship with said adjoining ground, and driving said stakes through said slots to secure the divider in place.

* * * * *